Figure 1:
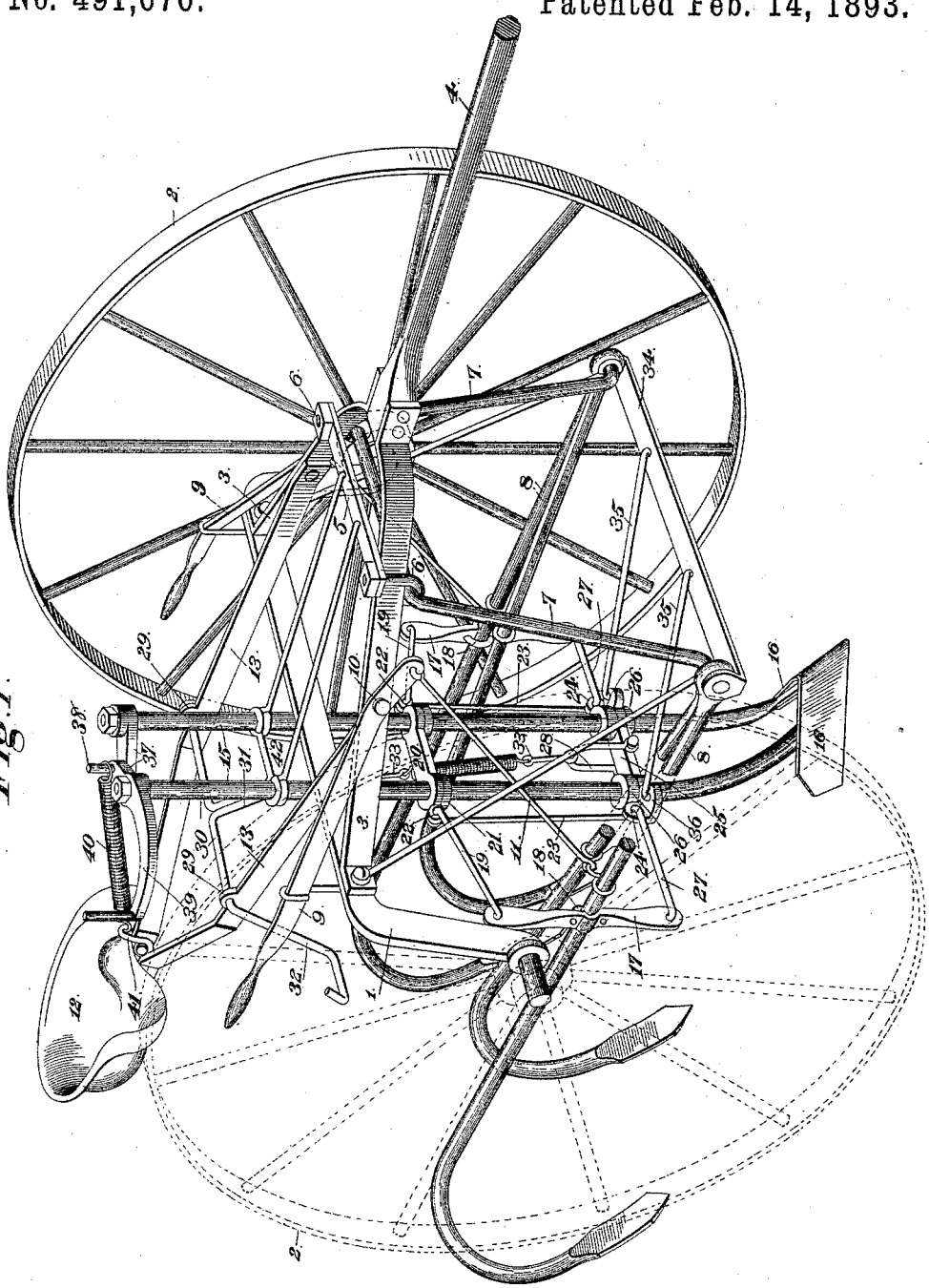

(No Model.) 2 Sheets—Sheet 1.

E. A. O. ERIKSEN & W. H. DAY.
HOE ATTACHMENT FOR CULTIVATORS.

No. 491,676. Patented Feb. 14, 1893.

Witnesses
M. E. Fowler
J. H. Siggers

Inventors
Eduard A. O. Eriksen
and William H. Day
By their Attorneys,
C. A. Snow & Co.

(No Model.) 2 Sheets—Sheet 2.
E. A. O. ERIKSEN & W. H. DAY.
HOE ATTACHMENT FOR CULTIVATORS.
No. 491,676. Patented Feb. 14, 1893.
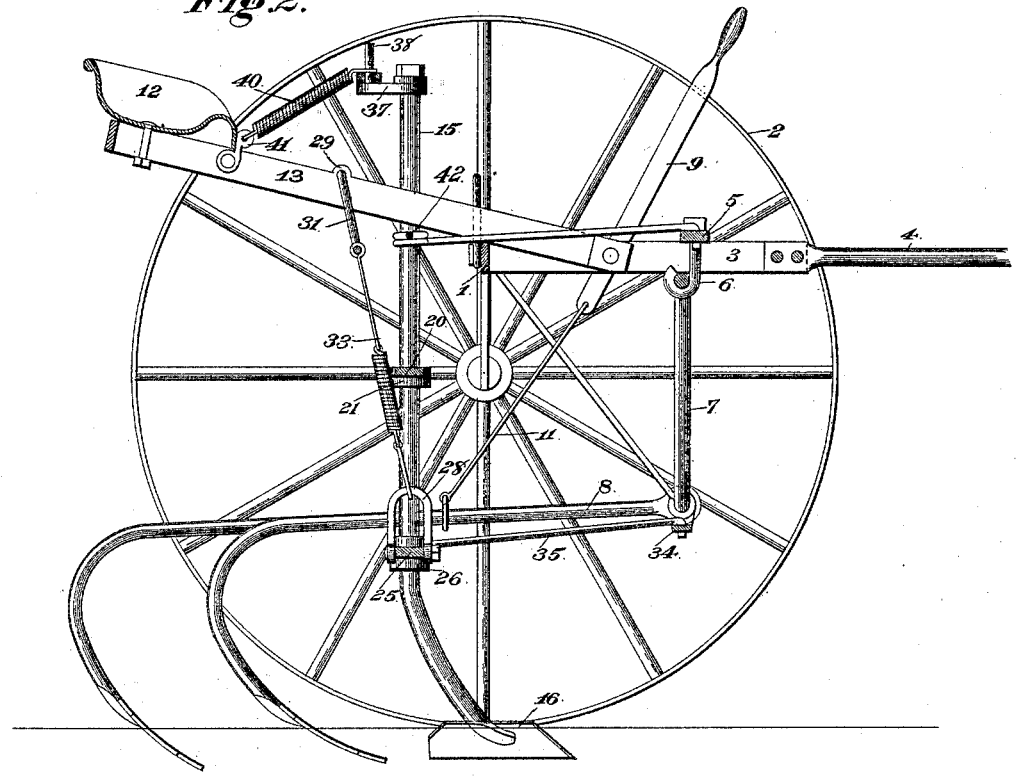
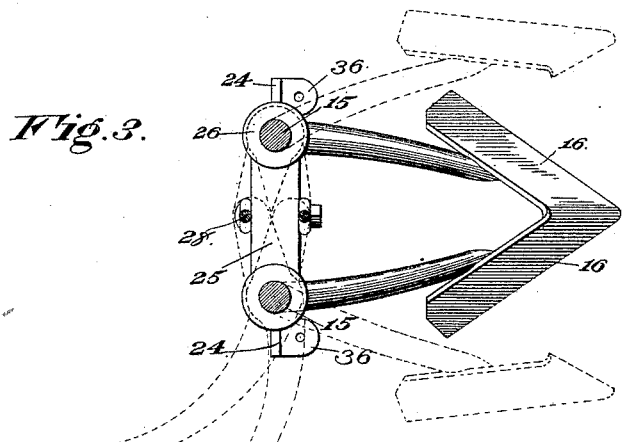
Witnesses
Inventors;
Edward A. O. Eriksen
and William H. Day
By their Attorneys,

UNITED STATES PATENT OFFICE.

EDUARD A. O. ERIKSEN AND WILLIAM HOWELL DAY, OF MORGAN, TEXAS.

HOE ATTACHMENT FOR CULTIVATORS.

SPECIFICATION forming part of Letters Patent No. 491,676, dated February 14, 1893.

Application filed September 14, 1892. Serial No. 445,875. (No model.)

*To all whom it may concern:*

Be it known that we, EDUARD A. O. ERIKSEN and WILLIAM HOWELL DAY, citizens of the United States, residing at Morgan, in the county of Bosque and State of Texas, have invented a new and useful Hoe Attachment for Cultivators, of which the following is a specification.

Our invention relates to improvements in cultivators; and the objects are to provide a hoe-attachment for the same so arranged and constructed as to be under the control of the operator whereby it may be thrown into and out of operation and employed for thinning crops simultaneous with the cultivation of the same with as much convenience and accuracy as the ordinary hand hoe and with greater expedition.

With these objects in view, and various other objects hereinafter appearing, the invention consists in certain features of construction hereinafter specified and particularly pointed out in the appended claims.

Referring to the drawings:—Figure 1 is a perspective view of a cultivator provided with our attachment. Fig. 2 is a vertical longitudinal section. Fig. 3 is a transverse section through the hoes.

Like numerals of reference indicate like parts in all the figures of the drawings.

1 designates the arched axle whose ends are provided with bearings for the accommodation of ground-wheels 2. Hounds 3, converge from the bent portions of the axle and are secured to the opposite sides of the central draft pole or tongue 4. A cross bar 5 surmounts the hounds near the juncture of the same with the draft pole or tongue, and the ends of the bar are perforated beyond the hounds for the accommodation of a pair of eye-bolts 6 which depend below the hounds, engage with the same, and support an inverted U-shaped suspension bail 7. The bail 7, which is thus loosely suspended, has its lower extremities outwardly turned or bent and passed through pairs of diverging rearwardly extending cultivator beams 8. Levers 9 are fulcrumed upon the hounds as at 10 and have their forward ends connected by rods 11 to the pairs of cultivator beams. These levers are designed to be manipulated by the driver when perched upon the seat 12 which is supported by a pair of rearward converging bars 13, whose front ends are secured to the hounds. The rear ends of the levers may be locked by any suitable device, but in the present instance may be locked by a pair of hook-shaped locking standards.

So far we have described the ordinary construction of a two-horse cultivator commonly employed for simultaneously cultivating the opposite sides of growing crops, such as corn, cotton, sorghum, and the like. We will now proceed to describe our attachment.

15 designates a pair of vertical, parallel hoe standards which are located between the seat bars in rear of the axle and between the pairs of cultivator beams. These standards have their lower ends forwardly curved to form feet, and to each foot is secured a normally, inwardly-disposed or convergent hoe-section 16. These hoe sections produce a V-shaped hoe designed to thin out the growth of grass, weeds, and plants being cultivated.

A pair of short vertical standards 17 are secured at their middles by clips 18 to the centers of the two outer cultivator beams. These standards extend above and below the cultivator beams and have their upper ends connected pivotally by short rods 19 with the outer ends of a transverse tie-yoke 20. The tie-yoke 20 is located above a pair of shoulders 21, with which the standards 15 are provided, and is perforated for the passage therethrough of the standards. The ends of the tie-yoke are provided with eyes 22 to which the short rods, just mentioned, are connected, and from these eyes also there depends a pair of short vertical rods 23, whose lower ends engage with eyes 24 formed in the extremities of a lower transverse tie-yoke 25. The tie-yoke 25 is located between annular shoulders 26 with which the vertical standards are provided and are pivotally connected to the lower ends of the short standards 17 by means of short rods 27.

A link 28 is pivotally connected to the center of the lower tie-yoke and above the same upon the seat bars in bearings 29 there is journaled a transverse shaft 30. This shaft has a central cranked portion 31 and at one end a handle 32 which may be manipulated by the driver when perched upon his seat. The crank 30 is connected to the link by a spring rod 33.

A transverse bar 34 has its ends upwardly bent for the reception of the ends of the intermediate U-shaped bail 7, and rods 35 are connected loosely at their front ends to this bar, and at their rear ends in eyes 36 in the ends of the lower yoke.

The upper ends of the hoe standards are provided with levers 37, which are pivotally connected at their inner ends by a bolt 38, and one of said levers has extended through its opposite side a handle 39. A spring 40 is connected to the bolt at one end and extends to the hook 41 under the seat, so that the levers are always drawn to the rear and consequently the hoe sections have their front ends normally drawn toward each other so as to form the completed hoe. By throwing the handle 39 to the rear against the tension of the spring 40 the hoe sections may be opened and thus fail to operate upon the plant and permit of the passage therethrough of any trash that may be collected.

In operation the machine is drawn along straddling in the usual manner, for instance a row of cotton and the hoe clears the same of trash, grass, weeds, and any growth whatever that may lie in its path, and at intervals the driver swings the handle to the rear for the purpose of opening the hoe sections, and thus leaving a stand of the plant unremoved. In this manner the same result is attained as by the use of the ordinary hand hoe, and drill plants may be thinned and brought to a stand in an expeditious, accurate manner.

A cross yoke 42 connects the standards near their upper ends and may serve as a foot-rest for the driver and by means of this bar the hoe may be depressed against the tension of the spring-connecting-rod and thus made to take deeper or shallower into the ground. The driver may manipulate the crank shaft so as to raise or lower the hoe out of operation without interfering with the cultivators, and by manipulating the levers may elevate the cultivators so as to render them inoperative as well.

Having described our invention, what we claim is:—

1. The combination with a double cultivator, of a pair of vertical rotatable hoe-carrying standards supported between the cultivators thereof, means for maintaining the hoe-sections in closed position and a lever for simultaneously swinging the same out of closed position substantially as specified.

2. The combination with a double cultivator, of a pair of vertical standards, the tie-yoke connecting the same, hoe sections on the lower ends of the standards, levers at the upper ends of the standards the inner ends of which are pivoted together, an operating lever extending from one of said pivoted levers, a coiled spring connected to the pivot point between the levers and to a stationary point of the machine in rear thereof, substantially as specified.

3. The combination with a double cultivator, of a pair of hoe standards, tie-yokes connecting the standard hoe sections at the lower ends of the standards and adapted to overlap each other, levers at the upper ends of the standards, a pivot bolt connecting the levers, a handle extending from one of the levers in a direction opposite the same, short vertical standards secured at their middles to the outer plow-standards, links loosely connected to the ends of the short vertical standards and to the opposite extremities of the yokes, bearing shoulders formed on the vertical standards, connecting links between the tie-yokes, seat supporting bars extending rearward from the frame and embracing the hoe standards, a hook on said bars, a coiled spring between the hook and the pivot bolt of the levers, a transverse shaft having an intermediate crank, and a handle at the end thereof, a spring rod connecting the intermediate crank with the tie-yoke, substantially as specified.

4. The combination with a double cultivator, of a pair of hoe standards, tie-yokes connecting the standards, hoe sections at the lower ends of the standards and adapted to overlap each other, levers at the upper ends of the standards, a pivot bolt connecting the levers, a handle extending from one of the levers in a direction opposite the same, short vertical standards secured at their middles to the outer plow-standards, links loosely connected to the ends of the short vertical standards and to the opposite extremities of the yokes, bearing shoulders formed on the vertical standards, connecting links between the tie-yokes, seat supporting bars extending rearward from the frame and embracing the hoe standards, a hook on said bars, a coiled spring between the hook and the pivot bolt of the levers, a transverse shaft having an intermediate crank and a handle at the end thereof, a spring rod connecting the intermediate crank with the tie-yoke, a transverse bar connected to the front ends of the cultivator standards, rods loosely connected to the same and at their rear ends to the lower yoke, a transverse bar surmounting the hounds, and rods loosely connected at their front ends to the transverse bar, and at their rear ends to the hoe standards, substantially as specified.

In testimony that we claim the foregoing as our own we have hereto affixed our signatures in the presence of two witnesses.

EDUARD A. O. ERIKSEN.
WILLIAM HOWELL DAY.

Witnesses:
A. W. McCARY,
J. W. GILPIN.